Nov. 12, 1940.   G. E. KING   2,221,584
CONTROL SYSTEM
Filed March 30, 1938   2 Sheets—Sheet 1

WITNESSES:

INVENTOR
George E. King.
BY
Paul E. Friedemann
ATTORNEY

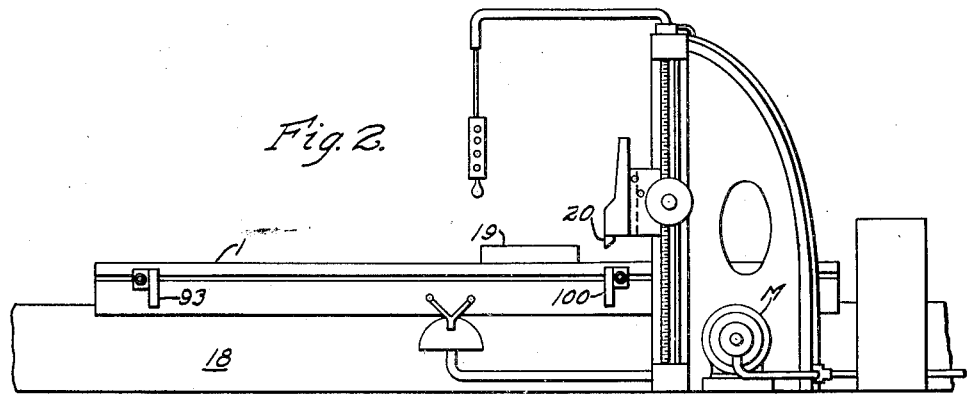
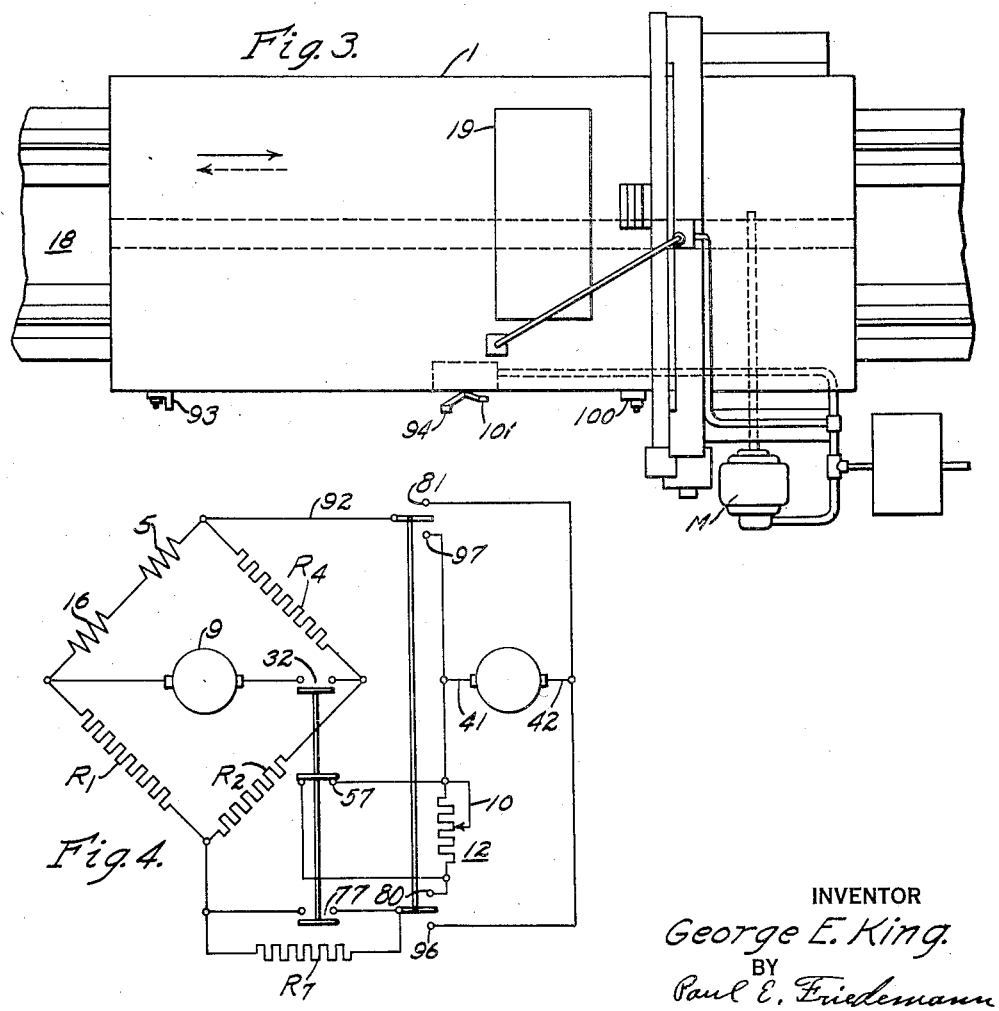

Patented Nov. 12, 1940

2,221,584

UNITED STATES PATENT OFFICE 2,221,584

CONTROL SYSTEM

George E. King, Wilkinsburg, Pa., assignor to Westinghouse Electric & Manufacturing Company, East Pittsburgh, Pa., a corporation of Pennsylvania Application March 30, 1938, Serial No. 198,883

3 Claims. (Cl. 90—24)

My invention relates to electric motor control systems, and more particularly to control systems for automatically controlling the operation of motors used to drive reciprocating mechanisms, such as elements of planers, draw-cut shapers, or roll grinders, transfer tables, etc., by a variable-voltage control.

In a conventional variable-voltage control, the motor is ordinarily provided with a separately excited field winding and the desired direction of rotation of the motor is effected by reversing the polarity of the energy supplied to the motor armature. The motor is arranged to be energized from a generator which may be provided with a series field winding to compensate for the IR drop in: the generator armature circuit; the armature circuit of the motor; the series field winding itself; and the leads interconnecting the generator and motor armatures. The generator is provided with a separately excited main field winding, the current through which is arranged to be controlled and reversed in order to operate the motor and the load attached thereto, for example a planer platen, at various speeds in either direction of travel. The excitation of the main field winding of the generator may be controlled by means of a rheostat or the combination of various resistors and suitable control devices for inserting various steps of resistance in circuit with the main field winding. For each position of the controller controlling the field current in the generator, there is a particular speed of operation of the motor and thus the load, as a planer platen, that is desired. Any departure in speed from the desired value introduces undesirable operations of the load. If it were possible to maintain all of the conditions affecting such a control constant the desired operation could be secured with the simple conventional variable-voltage control just briefly explained.

Since it is impossible to maintain the conditions affecting a variable-voltage control constant I use, with such control, a regulator-generator having a series field winding 14 arranged to be responsive to the current supplied to the motor, a main or shunt field winding arranged to be responsive to the voltage applied to the motor and a field winding responsive to the excitation current of the shunt field winding of the generator to be controlled. These field windings are so disposed that the regulator-generator in operation generates a corrective voltage. The armature of the regulator-generator is connected in series circuit relation with, one field winding of the regulator-generator, the field winding of the generator of the variable-voltage system, and to the controller, which controller may be operated to independently vary the flow of current through the main generator field winding.

By a proper selection of the electrical characteristics and constants of the electrical units included with the variable-voltage control I have devised, and by making some minor compromises, the desired functioning can be secured, that is, the motor speed can be made proportional to the setting of the controller regardless of: variations in load on the motor; direction of operation of the motor; variations in ambient temperature; and regardless of the many other factors that would ordinarily prevent the desired operation of the motor.

One object of my invention is to provide a constant speed for a tool operating machine regardless of the variations in load on the machine.

A broad object of my invention is to provide a control for an electrically operated tool operating machine so as to cause said machine to operate at any selected constant speed for any selected direction of operation regardless of the variable characteristics of the system.

Another object of my invention is to provide for constant speed of operation of a tool operating machine, through electrical means, regardless of load variations on the machine that vary from full load overhauling through zero to full load.

A still further object of my invention is to automatically and invariably secure the same operation of a machine for a given control position of a controller for the machine regardless of any other forces, than those set in operation by the controller, that might influence the operation of the machine.

It is also an object of my invention to provide for any selected constant speed of operation for either direction of operation of a reciprocating machine.

A more specific object of my invention is to provide for so controlling a reversible motor, operating a machine tool, as a planer platen, a roll table, etc., so as to provide any selected constant speed of operation for the machine for one direction of operation of the motor and to provide any selected constant speed of operation for the machine for another direction of operation of the motor.

It is also a general object of my invention to provide a control system for a tool operating machine that shall be simple, efficient and accurate in operation, and which may be readily and economically manufactured and installed.

Other objects and advantages will become more apparent from a study of the following specification when considered in conjunction with the accompanying drawings, in which:

Fig. 2 is a side view, somewhat diagrammatic, of a planer having a tool support and having a motor for operating the platen;

Fig. 3 is a plan view of the subject matter shown in Fig. 2; and

Fig. 4 is an elemental circuit diagram of that portion of my system of control separated from the machine with which it is to coact.

Figure 1:
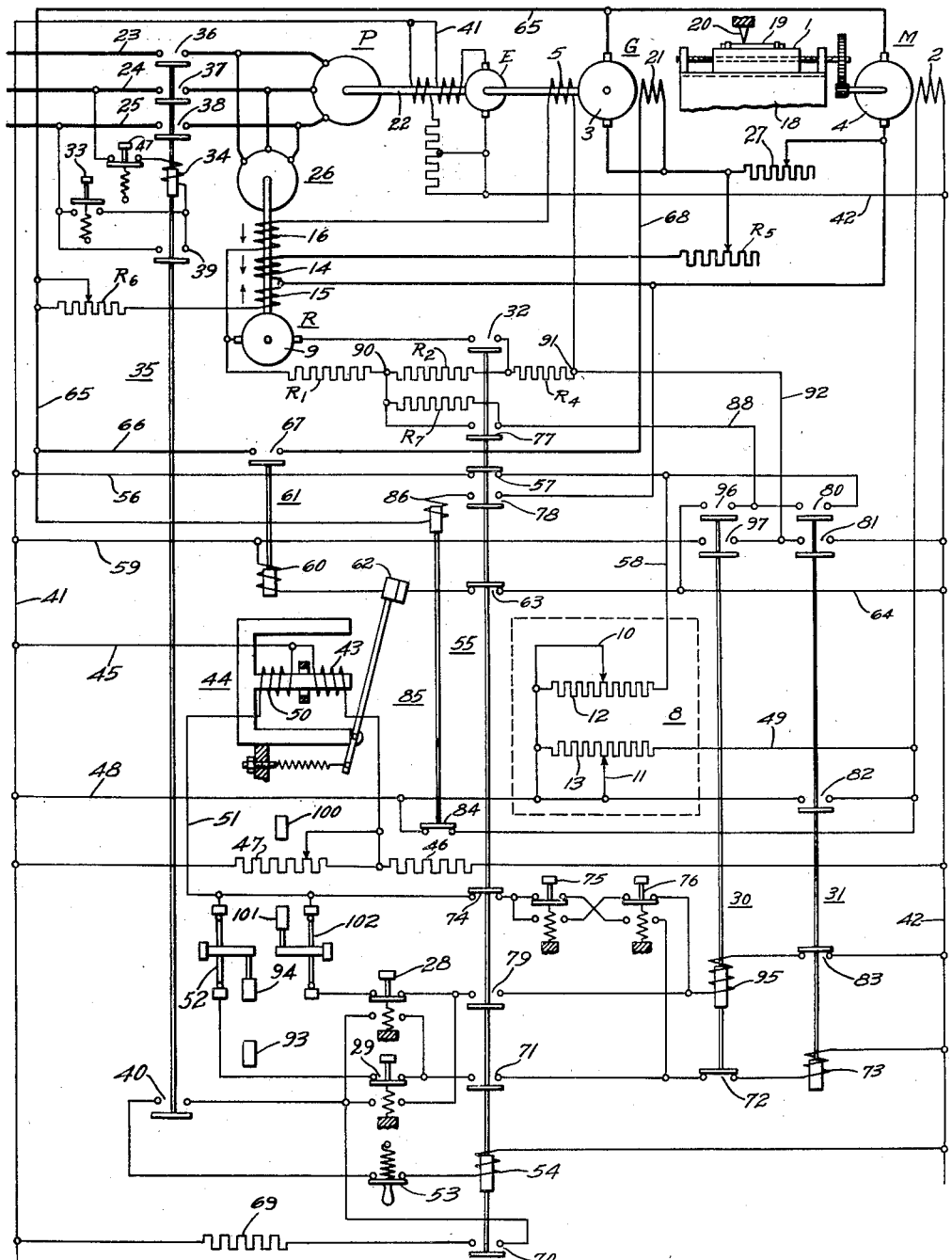
Fig. 1 is a diagrammatic representation of a system of control for a reversible motor operating a planer platen or other tool actuating machine.

In the practice of my invention, I provide a variable-voltage control in which the motor M is mechanically coupled to drive a machine tool, as a planer platen 1. The motor M is provided with a separately excited field winding 2 which is arranged to be energized in a single direction only. A generator G is provided having its armature 3 substantially directly connected to the motor armature 4. The control of the speed of the motor, and in consequence the planer platen and the direction of movement of the planer platen is effected by varying the amount and direction of excitation of the field winding 5 of the main generator. This control may be effected in a few steps or in many steps, depending upon the type of operation that is desired.

In order to maintain the speed of the motor M at various constant values corresponding to various settings of the controller 8 used for controlling the current flowing through the main field winding 5 of the generator, a regulator-generator R is provided which is arranged to measure the speed and load of the motor and the current flowing through the main field winding 5 of the generator. The armature 9 of the regulator-generator is arranged so that it may be connected in series circuit relation with the generator field winding 5, whereby the voltage generated in the armature 3, in response to the speed and load of the motor and the current flowing through the generator field winding, will cause a current to flow through the main generator field winding 5, which current will be a function of the departure of the motor speed from a predetermined value corresponding to the particular setting of the controller 8 for the main field winding, that is, corresponding to the adjustment of lead 10 on the rheostat 12.

Under certain load and operating conditions, no voltage will be generated in the armature 9 of the regulator-generator R since under these conditions, the speed of the motor M corresponds to the setting of the controller 8. For all other conditions, however, a voltage will be generated in the armature of the regulator-generator in such direction and of such a value as to cause the required current to flow through the main field winding 5 of the generator G to operate the motor M at the desired speed.

In order to measure the speed and load applied to the motor M, the regulator-generator is provided with a series field winding 14 through which all or a portion of the current flowing from the generator G to the motor M flows. The regulator-generator is also provided with a main field winding 15 which is connected to be responsive to the voltage applied to the motor M. This winding 15 may also be designated a shunt field winding since it is shunted across the generator armature 3. These two field windings, namely 14 and 15, are differentially related to each other so that the resulting magneto-motive force is a function of the speed of the motor, as measured by the counter-electro-motive-force of the motor M, that is, the magneto-motive force produced by the series field winding 14 is proportional to the IR drop of the motor armature 4, and the magneto-motive force produced by the main field winding 15 of the regulator-generator is proportional to the voltage impressed across the terminals of the armature of the motor. Thus, the resulting magneto-motive force due to the differential relationship between the two field windings (considering these fields only), is a function of the counter-electro-motive-force of the motor. Since this magneto-motive force results from the combined action of the current flowing through the motor armature and the voltage applied thereto, it is also a function of the load carried by the motor. The voltage which is generated in the armature of the regulator-generator, due to this resulting magneto-motive force, is then a function of the speed of the motor and the load carried thereby.

It is desirable that any change caused in the excitation of main generator caused by the voltage generated in the regulator-generator armature and affecting the current flowing through the main field winding 5 of the generator G be immediately reflected in the voltage generated in the armature 9 of the regulator-generator R. Such action is desired in order to prevent hunting of the system. As soon as a voltage appears in the armature of the regulator-generator, indicating that the speed of the motor M has departed from the desired speed, a change in the flow of current through the main field winding 5 of the generator G takes place in such direction as to tend to restore the speed of the motor to the desired speed. If some means is not provided for immediately effecting a corresponding change in the corrective voltage generated in the armature 9 of the regulator-generator R, the resulting change in the fluxes of the series and main field windings 14 and 15, respectively, of the regulator-generator in response to the corrective effect, will take place too late. As a result, the speed of the motor will be altered more than is desired and hunting will result.

In order to make the correction applied by the regulator-generator proportional to the departure of the speed of the motor from the desired speed corresponding to a particular setting of the controller for the main field winding 5 of the generator G, a differential field winding 16 is provided in the regulator-generator. This field winding 16 is connected in series circuit relation with the main field winding 5 of the generator G. Thus, any change in current which flows through the main generator field winding 5 is immediately reflected in the voltage which is generated by the armature of the regulator-generator. It is then unnecessary to await the correction in the speed of the motor, as reflected in the change in the magneto-motive forces produced by the series and main field windings of the regulator-generator to correspondingly affect the voltage generated by the armature of the regulator-generator. The differential field winding 16 of the regulator-generator is arranged to produce a magneto-motive force in the same direction as the magneto-motive force produced by the series field winding 14 of the regulator-generator and, therefore, it opposes or is differentially related to the magneto-motive force produced by the main field winding 15 of the regulator-generator. There is always, then, a certain relationship between the speed and load of the motor and the corrective effect caused thereby in altering the flow of current through the main field winding of the generator. As a result, the system is free from hunting and the speed of the motor is maintained at predetermined values corresponding to various settings of the lead 10 of the controller 8 regardless of variable conditions which would otherwise affect the speed and cause it to change from the desired value.

As has been stated hereinbefore, it is desirable to effect a corrective action in the current flowing through the main field winding 5 of the generator G by means of the regulator-generator R, without altering the current flow through the main field winding 5 from the controller. It is then possible to maintain a precise relationship between the speed of the motor and the corresponding movement of the planer platen and the various settings of the controller, regardless of the load or other variable conditions which otherwise would normally affect the operation of the motor.

I have discovered that a Wheatstone bridge arrangement may be combined with the control for machine tools to effect the desired independent control of the current flowing through the main field winding 5 of the generator G. I provide a balanced Wheatstone bridge circuit in which the differential field winding 16 of a regulator-generator and the main generator field winding 5 are connected in series circuit relation and form a part or all of one of the branches of the bridge circuit. The armature of the regulator-generator is connected across one pair of opposite terminals of the Wheatstone bridge circuit while the remaining pair of terminals is connected through some switches through the controller to an independent source of energy. With such an arrangement it is possible to vary the current flowing through the branch of the bridge containing the main field winding 5 of the generator G by means of the controller 8 independently of the current flow therethrough from the armature of the regulator-generator, and vice-versa.

Referring more particularly to the drawings, M designates generally the motor mechanically coupled to drive the planer platen 1 of the planer 18. A work piece 19 is shown mounted on the platen and as the platen reciprocates by reason of the reversing operation of the motor M the tool 20 mounted on a cross rail, not shown, operates on the work piece 19.

The motor is substantially directly electrically connected to the generator G. The generator G has a main field winding 5 and a differential stabilizing field winding 21. The armature 3 of the generator G is mechanically coupled to the shaft 22 of the induction motor, or other prime mover, P. This induction motor P is disposed to be connected to the buses 23, 24 and 25, leading to a suitable source of alternating current energy.

In order that I may control the functioning of the system in the manner desired, I utilize a regulator-generator generally designated R, which regulator-generator has the armature 9 mechanically coupled to an induction motor 26. Motor 26 is provided to drive the regulator-generator at a relatively constant speed. The regulator-generator may be operated at the same speed as the generator G. In practice, since dynamo-electric machines 26 and R are of about the same, relatively small, capacity, they will be built as a unit having the same frame and shaft. If desirable, the regulator-generator may be mechanically coupled to shaft 22.

As shown in the drawings, the regulator-generator R is provided with a shunt or main field winding 15, a differential field winding 16, and a series field winding 14. As indicated by the arrows adjacent these mentioned field windings, differential field winding 16 and the series field winding 14 are so wound on the pole pieces of the regulator-generator R that they produce magneto-motive forces in the same direction but opposite to the direction of the magneto-motive force produced by the shunt field winding 15.

Assuming the generator G is in operation, the starting of the motor M is controlled by push-button switches 28 and 29 which control reversing or directional contactors 30 and 31. The operation of either of the reversing contactors effects the connection of the controller 8 in the system of control. The current through the Wheatstone bridge is in one direction when directional contactor 30 is operated and in another direction when directional contactor 31 is operated.

It is desirable to independently control the flow of current through the main field winding 5 of the generator G from two sources, one of the sources comprising the exciter E across the armature terminals of which the rheostat 12 and the Wheatstone bridge are connected, and the other source comprising the armature 9 of the regulator-generator. For this purpose, I provide, as already suggested, a Wheatstone bridge circuit comprising the customary four branches, three of which may be the resistors $R_1$, $R_2$ and $R_4$, the remaining branch comprising the differential field winding 16 of the regulator-generator and the main field winding 5 of the generator G.

The armature 9 of the regulator-generator is connected through a switch 32 across a pair of opposite terminals of the bridge circuit while the remaining two terminals of the bridge are connected through the rheostat 12 and a resistor $R_7$ and certain switches of the directional contactors 30 and 31 to the exciter E. The series field winding 14 of the regulator-generator R is connected, as illustrated, in series circuit relation with an adjustable resistor $R_5$ disposed in the circuit connecting the armatures 3 and 4 of the generator G and motor M, respectively. An adjustable shunt 27 may be provided for adjusting the flow of current through the series field winding 14. The shunt field winding 15 of the regulator-generator is connected through an adjustable resistor $R_6$ across the armature terminals of the motor M. The resistor $R_6$ is used to reduce the heat loss in the main field winding 15, and in consequence reduces to a minimum any change in resistance of the field winding 15 by reason of temperature changes.

To analyze the functioning of the Wheatstone bridge and the regulator-generator, an investigation of the mathematical relations of the circuit characteristics may not be amiss.

Let V = the control voltage that may be obtained from the controller 8, that is, the voltage from junction 90 to junction 91.

Let the four branches of the Wheatstone bridge be indicated by the resistors $R_1$, $R_2$, $R_3$ and $R_4$. The resistor $R_3$ is, of course, composed of the resistance value of the differential field winding 16 of the regulator-generator R and the main field winding 5 of the generator G. It may in some instances be necessary to also insert an adjustable resistor in this third branch of the bridge.

Let $E_R$=the voltage obtained from the armature of the regulator-generator.

Let $I_1$, $I_2$, $I_3$, and $I_4$ indicate the currents flowing in the branches of the Wheatstone bridge.

Let $R_5$ also indicate the resistance value of the adjustable resistor $R_5$ connected in series with field winding 14.

Let $R_6$ also indicate the resistance value of the adjustable resistor $R_6$ connected in series with the main field winding 15.

In order to show that the current flowing through the generator field winding 5 in one of the branches of the bridge circuit may be independently changed by altering either the control voltage or the voltage supplied by the regulator-generator R, the following derivation of the current flowing through this winding is set forth; and, based on the assumption that the bridge circuit is balanced, (1) $\quad V = I_1 R_1 + I_2 R_2$, and $I_1 = \dfrac{V - I_2 R_2}{R_1}$ (2) $\quad E_R = I_3 R_3 - I_4 R_4$, and $I_4 = \dfrac{I_3 R_3 - E_R}{R_4}$ and (3) $\quad V = I_2 R_2 - E_R + I_3 R_3$, and $I_2 = \dfrac{V + E_R - I_3 R_3}{R_2}$ (4) $\quad I_1 + I_2 = I_3 + I_4$ Solving in (4) for $I_3$ from (1), (2) and (3), (5) $\quad I_3 = \dfrac{V - I_2 R_2}{R_1} + \dfrac{V + E_R - I_3 R_3}{R_2} - \dfrac{I_3 R_3 - E_R}{R_4}$ Simplifying, then (6) $\quad I_3 = \dfrac{V(R_1 R_4 + R_2 R_4)}{R_2 R_3 R_4 + R_1 R_3 R_4 + R_1 R_2 R_3 + R_1 R_2 R_4} + \dfrac{E_R(R_1 R_4 + R_1 R_2)}{R_2 R_3 R_4 + R_1 R_3 R_4 + R_1 R_2 R_3 + R_1 R_2 R_4}$ Since in a Wheatstone bridge the following relation $R_1 R_4 = R_2 R_3$ is true then by substituting in (6) and further simplifying I obtain (7) $\quad I_3 = \dfrac{E_R}{R_3 + R_4} + \dfrac{V}{R_1 + R_2}$ From Equation 7 it will be apparent that either the control voltage V, or the regulator voltage $E_R$ may be changed to independently produce changes in the current $I_3$ flowing through the field winding 5 of the generator G.

As has been hereinbefore pointed out, it is desirable to maintain a predetermined relationship between the speed of the motor M and the control voltage V represented by the setting of the lead 10, of the controller 8, regardless of the variable characteristics of the system or the direction of rotation of the motor M. The regulator-generator R serves as an automatic compensator to effect this desired relationship. When the regulator-generator is used there is a constant relation between the speed of the motor M and the control voltage V, which relation, due to the regulator-generator R, is unaffected by the variable characteristics of the system. That this relationship is true will be apparent from the following:

The voltages generated by the regulator-generator, when the field windings are individually excited, may be represented by the following equations:

(8) Voltage resulting from the excited differential field winding, 16, $E_{16}=k_{16}I_{16}$;

(9) Voltage resulting from the excited shunt or main field winding, 15, $E_{15}=k_{15}I_{15}$;

(10) Voltage resulting from the excited series field winding, 14, $E_{14}=k_{14}I_{14}$; where $I_{16}$ is the current in winding 16, $I_{15}$ is the current in winding 15, and $I_{14}$ is the current in winding 14, and $k_{16}$, $k_{15}$, and $k_{14}$ are constants obtained from the magnetization curves of the regulator-generator R, when it is individually excited by the respective field windings.

The voltage $E_R$ generated by the armature of the regulator-generator equals the sum of the individual voltages generated by the three field windings when they are simultaneously energized. Since the effect of winding 16 is opposite to the effect of windings 14 and 15,

(11) $\quad E_R = k_{15}I_{15} - k_{16}I_{16} + k_{14}I_{14}$

Since $I_{16}=I_3$ Equation 7 may be rewritten

(12) $\quad E_R = I_{16}(R_3+R_4) - \dfrac{V(R_3+R_4)}{R_1+R_2}$

To accomplish all the desired results, in addition to the relations of the electrical constants already pointed out, it is necessary to make the sum of the resistances $R_3$ and $R_4$ equal to the constant $k_{16}$. Employing this relationship and combining (11) and (12) the following equation is obtained:

(13) $\quad k_{15}I_{15} = \dfrac{Vk_{16}}{R_1+R_2} + k_{14}I_{14}$

The current flowing through the main or shunt field winding 15 of the regulator-generator R may be expressed by the following equation:

(14) $\quad I_{15} = \dfrac{E_3 - I_{15}R_5}{R_5+R_{15}}$ where $E_3$ represents the voltage of generator G.

Substituting in (13) I obtain the following relation:

(15) $\quad \dfrac{k_{15}(E_3 - I_{15}R_5)}{R_5+R_{15}} = \dfrac{Vk_{16}}{R_1+R_2} + k_{14}I_{14}$

(16) $\quad E_3 = \dfrac{Vk_{16}(R_5+R_{15})}{k_{15}(R_1+R_2)} + \dfrac{I_{14}k_{14}(R_5+R_{15})}{k_{15}} + I_{15}R_5$ Since the resistance $R_{15}$ of the regulator series field winding is negligible and the current flowing through the main field winding 15 is also negligible as compared to the current flowing to the motor M, both of these values may be neglected and the counter electro-motive force of the motor M or its speed may be represented:

(17) $\quad E_M = E_3 - I_M(R_1+R_M)$ or combining (16) and (17)

(18) $\quad E_M = \dfrac{Vk_{16}(R_5+R_{15})}{k_{15}(R_1+R_2)} + I_{14}\left[\dfrac{k_{14}(R_5+R_{15})}{k_{15}} - E_M\right]$ By proper selection of the value of $R_{14}$ and if necessary the value of $k_{16}$, $k_{14}$, $R_5$ and $R_{15}$, $E_M$ may be made to equal $$\dfrac{k_{16}(R_5+R_{15})}{k_{15}}$$

This means that

(19) $\quad E_M = \dfrac{Vk_{16}(R_5+R_{15})}{k_{15}(R_1+R_2)}$ or $E_M = KV$.

Equation 19 thus shows that the speed of the motor M, as represented by its counter-electromotive force $E_M$, and thus the speed of the planer platen will always be equal to a constant, as K, times the control voltage V, i. e., $E_M$ will always be directly proportional to control voltage V, namely, will always be directly proportional to the changes in position of lead 10, regardless of the variable characteristics of the operation of the system.

A still better understanding of my system of control may be had from a more detailed study of its operation.

If the attendant wishes to start the system, he depresses pushbutton switch 33 whereby a circuit is established from the bus 25 through switch 33, actuating coil 34 of the line switch, or contactor 35, stop pushbutton switch 47 to the bus 24. Operation of contactor 35 causes the closing of switches 36, 37, 38, 39 and 40. The closure of switches 36, 37, and 38 causes the energization of motors P and 26. Regulator-generator R, the main generator G, and exciter E are thus caused to operate. Closure of switch 39 establishes a holding circuit for coil 34, whereas the closure of switch 40 sets up a circuit connection to be described later.

When the motors P and 26 are up to speed, the machine 18 may be started. The exciter E will at such time generate normal voltage to thus place a predetermined potential or voltage across buses 41 and 42.

Energization of buses 41 and 42 provides energization for the neutralizing coil 43 of the time limit relay 44. The circuit for this coil may be traced from bus 41 through conductor 45, coil 43, resistor 46 to the bus 42. The effect of coil 43 may be adjusted by adjustable resistor 47.

The field winding 2 of the motor M is also energized by the energization of buses 41 and 42. The circuit for this field may be traced from bus 41 through conductor 48, the field rheostat comprising the resistor 13 and adjustable lead 11, conductor 49, through field winding 2 to bus 42 and also through the contact members 84, of accelerating control relay 85, shunting the field rheostat. An additional circuit for the motor field is also established from bus 41 through conductor 56, contact members, or switch 57, conductor 58, the controller 8, conductor 49, field winding 2 to bus 42.

A still further circuit is established from bus 41 through conductor 59, actuating coil 60 of generator stabilizing field control relay 61, contact members 62 of time limit relay 44, contact members 63 of control relay 55, and conductor 64 to bus 42. Operation of relay 61 establishes a circuit from the upper armature terminal of the generator G through conductors 65 and 66, contact members 67, conductor 68, generator stabilizing field winding 21 to the lower armature terminal of the generator G. Since the generator G is not generating any material voltage, motor M will not operate.

To effect normal operation either one of the switches 28 or 29 should be operated. Let switch 28 be the forward control pushbutton switch. To effect forward operation, that is, an operation in the cut direction, the attendant depresses the switch 28. A circuit is immediately established from bus 41 through conductor 45, the magnetizing coil 50 of the time limit switch 44, conductor 51, reversing limit switch 52, reverse starting pushbutton switch 29, the lower terminals of switch 28, switch 40, stop switch 53 and actuating coil 54 of the regulator-generator control relay 55 to the bus 42. Time limit relay 44 has a very negligible time constant when coil 50 is energized with the result that contact members 62 open immediately, whereupon coil 60 is deenergized and contact members 67 open the circuit for the stabilizing field winding 21.

Operation of relay 55 establishes a holding circuit for itself through resistor 69 and contact members 70 and 40. Relay 55 closes switch 71 whereupon a circuit is established from energized conductor 51, through limit switch 52, switch 29, contact members 71 and 72, actuating coil 73 of the forward directional contactor 31 to the bus 42.

The relay 55 also opens switches 57, 63 and 74. Switch, or contact members, 57 opens one of the parallel circuits for the field winding 2, namely, the circuit including the upper portion of the controller 8. The opening of switch 63 makes doubly certain that coil 60 is not energized after the generator G operates normally. Opening of switch 74 eliminates the inching push buttons 75 and 76 for inching control.

The operation of relay 55 also causes the closing of contact members 32, 77, 78 and 79. Closure of contact members 32 inserts the armature 9 of the regulator-generator R in the control system. Closure of contact members 77 shunts resistor $R_7$ so that the voltage V across the junctions 90 and 91 of the Wheatstone bridge will principally be a function of the position of lead 10 on the rheostat 12.

Closure of switch, or contact members, 71, from the circuit previously traced, causes the operation of forward directional contactor 31 which contactor causes the opening of contact members 83, so that the closure of contact members 79 will have no effect, and causes the closure of contact members 80, 81 and 82. Closure of contact members 82 assures a strong energization of the field winding 2 even though contact members 84 open by reason of the energization of coil 86 of the relay 85 by the closure of contact members 78. Motor M will thus have a slow cutting speed and have a high torque.

Closure of contact members 80 and 81 establishes a circuit from bus 41 through conductor 48, adjustable lead 10, a portion of the resistor of rheostat 12, conductor 58, contact members 80, conductor 88, contact members 77 to junction 90 of the Wheatstone bridge heretofore analyzed, through the Wheatstone bridge to the junction 91, conductor 92, and contact members 81 to the bus 42. The regulator-generator R connected in the Wheatstone bridge having the relative circuit constants hereinbefore specified and excited in the manner hereinbefore specified will thus produce a control effect so as to give the planer platen a speed in the cut direction which is a direct function of the position of lead 10 on the rheostat 12. Neither the cutting load, the ambient temperature, the temperature of the electric units, nor any other of the many factors that might otherwise affect the speed of operation of the motor M will have any material effect. The speed of motor M will be determined by the position of the controller lever, that is, the adjustment of leads 10 and 11.

As the planer platen moves to the end of its stroke, a dog schematically indicated by the block 93 mounted on the platen actuates the lever 94 to open the switch 52. Coils 50 and 73 are thus deenergized. Contact members 80, 81 and 82 open and contact members 83 close.

Since the voltage of the generator G becomes low by reason of the opening of contact members 80 and 81, the coil 86 is deenergized and in consequence the contact members 84 close to thus maintain a strong field excitation on motor M.

Closure of contact members 83 causes the energization of coil 95 with the result that contact members 96 and 97 close to reverse the polarity of the generator G. The circuit for the generator field winding 6 may now be traced from bus 41, conductor 59, contact members 97, conductor 92 to junction 91, the Wheatstone bridge including the field winding 6, the junction 90, contact members 77, conductor 88, contact members 96, and conductor 64 to bus 42. It will be noted that the controller is not used and that the full voltage of buses 41 and 42 is applied to the Wheatstone bridge. This arrangement assures a higher voltage of the generator during the return stroke and thus a higher speed of the motor M.

As soon as the voltage of the generator G builds up to a sufficient value the field excitation of the motor field 2 is decreased to thus further increase the motor speed. This is accomplished through the relay 85. The reenergization of coil 86 causes the opening of contact members 84 whereupon a portion of the resistor 13 is inserted in the circuit of the field winding.

As the motor M reverses dog 93 operates back to the position shown to thus set up the connection for the cut operation which is set up at the end of the return stroke when the dog 100 operates lever 101 to open switch 102 to deenergize the coil 95.

The instant the return or reverse contactor 30 drops coil 73 is energized and contact members 82 closed to give a strong field to motor M and dog 100 resets switch 102 to the position shown.

I am, of course, aware that others, particularly after having the benefit of the teachings of my invention, may devise other circuit diagrams for accomplishing the novel results I have herein disclosed, but I do not wish to be limited to the particular embodiment of my invention herein disclosed, but wish to be limited only by the scope of the claims hereto appended and by such prior art as may be pertinent.

I claim as my invention:

1. In a system of control for controlling the speed of operation of a planer platen, in combination, a reciprocable planer platen, a direct current motor for reciprocating the platen, a direct-current generator having its armature connected in series with the motor armature, a field winding for the generator including in its circuit a constant voltage exciter, reversing switches for reversing the generator field, electromagnetic means operable by the planer platen adapted to automatically effect the operation of the reversing switches, a controller, a regulating-generator connected in the circuit so as not to have any effect on the voltage of the constant voltage exciter but whose effect on the generator field may be either additive or subtractive to the effect of the exciter voltage as modified by the controller, and circuits for controlling the operative effect of the regulator-generator and whose characteristics are so selected that the speed of the motor is substantially entirely a function of the controller operation only.

2. In a control for a machine, in combination, a reciprocating planer platen, a reversible direct-current motor for reciprocating the platen, a generator connected to energize the motor, reversing and speed control means for controlling the voltage applied to the motor and for controlling the excitation of the motor to effect a rapid change of speed of the member from a given full speed in one direction to a given full speed in another direction, and means operable by the planer platen adapted to automatically effect the operation of said reversing and speed control means, a field winding for said generator, regulating means for counteracting the effect of variables on the normal speed, in contradistinction from the reversing speed, of the motor, said regulating means comprising means for producing an effect on said generator field winding dependent on the voltage of the generator supplying energy to the motor, means serially connected with said generator field winding for producing an effect on the generator field winding dependent on the current in said generator field winding, and means for producing a still further effect in said field winding responsive to the load current of said motor which modifies said first two effects, control means for varying the component of excitation of said generator independently of the operating characteristics of said motor and said generator, and means for preventing interchange of energy between said regulating means and said control means.

3. In a system of control for controlling the operation of a machine tool, in combination, a member and a tool adapted to operate on a work piece, a direct-current motor for causing relative movement of the member and tool to thus effect shaping of the work piece, a direct-current generator having its armature connected in series with the motor armature, a field winding for the generator including in its circuit an exciter generating a substantially constant voltage, reversing switches for reversing the connection of the generator field winding to the exciter, a controller for selectively varying the voltage impressed on the generator field winding, electromagnetic means operable by the relative movement of the tool and member adapted to automatically effect the operation of the reversing switches, a regulating-generator so connected in the generator field circuit as not to have any effect on the voltage of the constant voltage exciter but whose effect on the generator field is either additive or subtractive to the effect of the exciter voltage as modified by the controller, and circuits for controlling the operative effect of the regulator-generator and whose characteristics are so selected that the speed of the motor is substantially entirely a function of the controller operation only.

GEORGE E. KING.